United States Patent
Liu et al.

(10) Patent No.: US 7,609,976 B2
(45) Date of Patent: Oct. 27, 2009

(54) METHOD AND SYSTEM FOR ULTRA-HIGH BIT RATE FIBER-OPTIC COMMUNICATIONS

(75) Inventors: Xiang Liu, Marlboro, NJ (US); Lothar Benedict Erhard Josef Moeller, Middletown, NJ (US); Yikai Su, Shanghai (CN); Chongjin Xie, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 672 days.

(21) Appl. No.: 11/239,656

(22) Filed: Sep. 29, 2005

(65) Prior Publication Data

US 2007/0071454 A1    Mar. 29, 2007

(51) Int. Cl.
*H04B 10/04* (2006.01)
(52) U.S. Cl. .................. 398/188; 398/152; 398/155
(58) Field of Classification Search .......... 398/183, 398/188, 152, 154, 155
See application file for complete search history.

(56) References Cited

OTHER PUBLICATIONS

Pitois, "Optimisation of phase alternation in 160 Gbit/s transmission systems," Optics Communications, vol. 242, issues 4-6, pp. 457-461, published online Sep. 11, 2004 and in print Dec. 8, 2004.*
Gill et al. "pi/2 Alternate-Phase On-Off Keyed 42.7 Gb/s Long-Haul Transmission Over 1980 km of Standard Single-Mode Fiber," IEEE Photonics Technology Letters, vol. 16, No. 3, pp. 906-908, Mar. 2004.*
Appathurai et al. "Effective suppression of intra-channel nonlinear distortion in 40 Gbit/s transmission over standard singlemode fibre using alternate-phase RZ and alternate polarization," Electronics Letters, vol. 20, issue 14, pp. 897-898, Jul. 8, 2004.*
L. Moller et al., "A 160-Gb/s Group-Alternating-Phase CSRZ Format," IEEE Photonics Tech. Lett., vol. 17, No. 10, October 1005, pp. 2233-2235.

* cited by examiner

*Primary Examiner*—Christina Y Leung
(74) *Attorney, Agent, or Firm*—Wall & Tong, LLP

(57) ABSTRACT

A method and system for ultra-high bit rate fiber-optic communications (e.g., 160 Gb/s) utilize a phase-correlated modulation format where phases of bits in adjacent four-bit groups in transmitted optical pulse trains are altered by $\pi$ (or 180°).

18 Claims, 3 Drawing Sheets

200

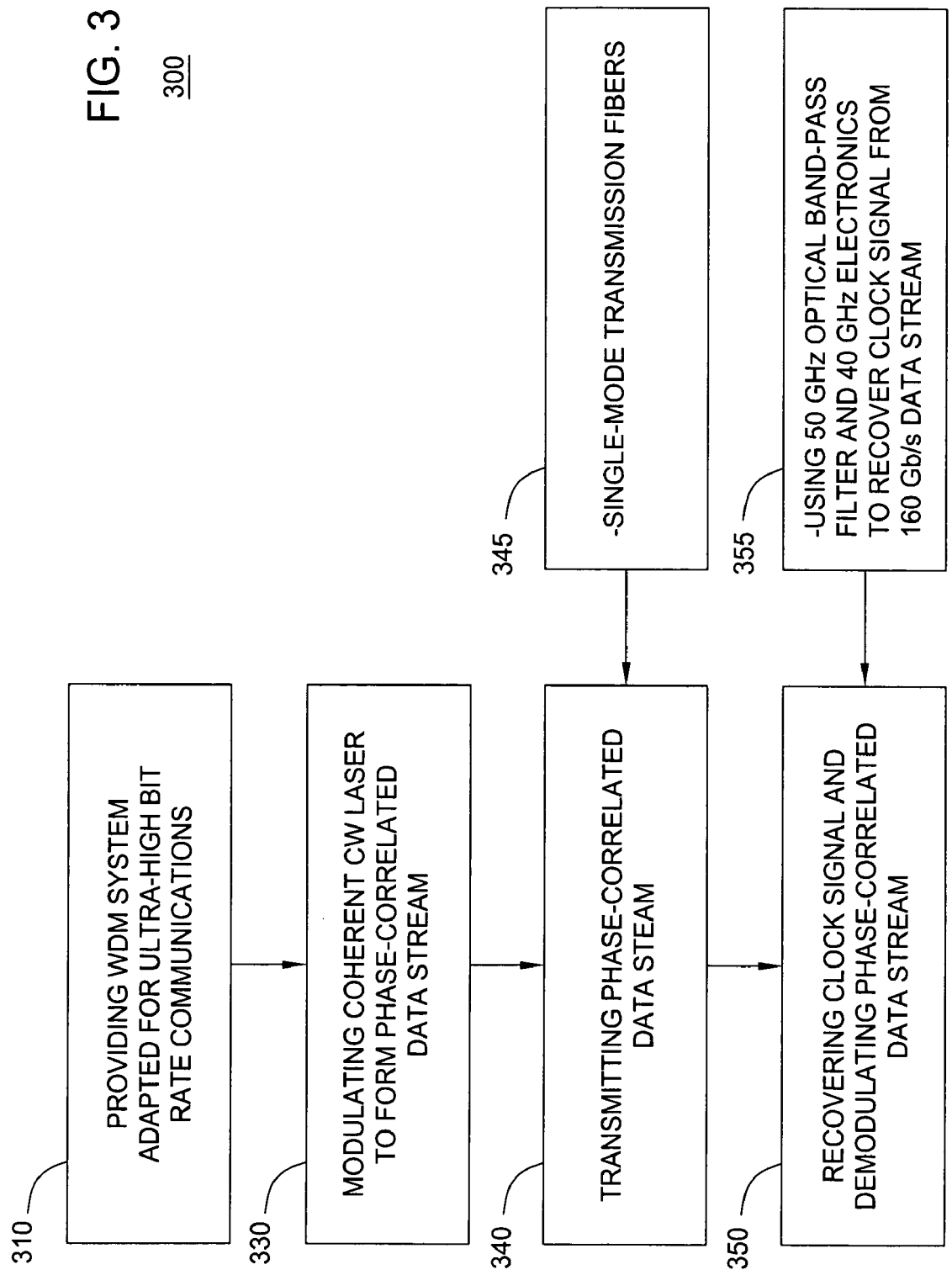

METHOD AND SYSTEM FOR ULTRA-HIGH BIT RATE FIBER-OPTIC COMMUNICATIONS

FIELD OF THE INVENTION

The invention relates to the field of fiber-optic communication systems and, in particular, to a method and system for ultra-high bit rate fiber-optic communications.

BACKGROUND OF THE INVENTION

Fiber-optic communication systems utilizing ultra-high bit rates (e.g., 160 Gb/s) provide low cost of ownership and reduce complexity of wavelength management. However, transmission errors caused by an intra-channel four-wave mixing (IFWM) phenomenon in transmission fibers and presently limited availability of 160 GHz electronics for synchronizing demodulated optical data streams cause delays in deployment of such systems.

SUMMARY OF THE INVENTION

Various deficiencies of the prior art are addressed by the present invention of a method and system for ultra-high bit rate (e.g., 160 Gb/s) fiber-optic communications.

One aspect of the invention is a fiber-optic communication system where a transmitter of a communication channel comprises a pump laser, an electro-optical converter including a modulator, and a continuous-wave (CW) coherent laser modulated using a Kerr-effect shutter controlled by a modulated output signal of the pump laser. A receiver of the communication channel comprises an opto-electronic demodulator and a synchronization circuit including an optical band-pass filter, an opto-electronic converter, and an electrical band-pass filter. In one embodiment, bandwidths of the optical and electrical band-pass filters are about ¼ of a channel bandwidth and bit rate, respectively.

Another aspect of the invention is a method of ultra-high bit rate fiber-optic communications suitable for execution using the inventive system. In one embodiment, the method comprises converting data to be transmitted in an optical domain by modulating a coherent CW laser using a modulating format that forms an optical data stream where phases of bits in adjacent four-bit groups are altered by π (or 180°) and recovering a clock signal in the received data stream using a synchronization circuit where components are otherwise designed for about ¼ of the data bit rate.

BRIEF DESCRIPTION OF THE DRAWINGS

The teachings of the present invention can be readily understood by considering the following detailed description in conjunction with the accompanying drawings, in which:

FIG. 3 depicts a flow diagram of a method for providing ultra-high bit rate fiber-optic communications using the system of FIG. 1 according to one embodiment of the present invention.

It is to be noted, however, that the appended drawings illustrate only exemplary embodiments of this invention and are therefore not to be considered limiting of its scope, for the invention may admit to other equally effective embodiments.

DETAILED DESCRIPTION OF THE INVENTION

The present invention will be generally described within the context of an ultra-high bit rate fiber-optic communication system. The present invention includes a novel format for phase coding of an optical signal. The present invention also includes an easy recovery of the clock signal using the novel format. It will be appreciated by those skilled in the art that the invention may be utilized within the context of both terrestrial and undersea fiber-optic communication systems and/or portions thereof.

Figure 1:
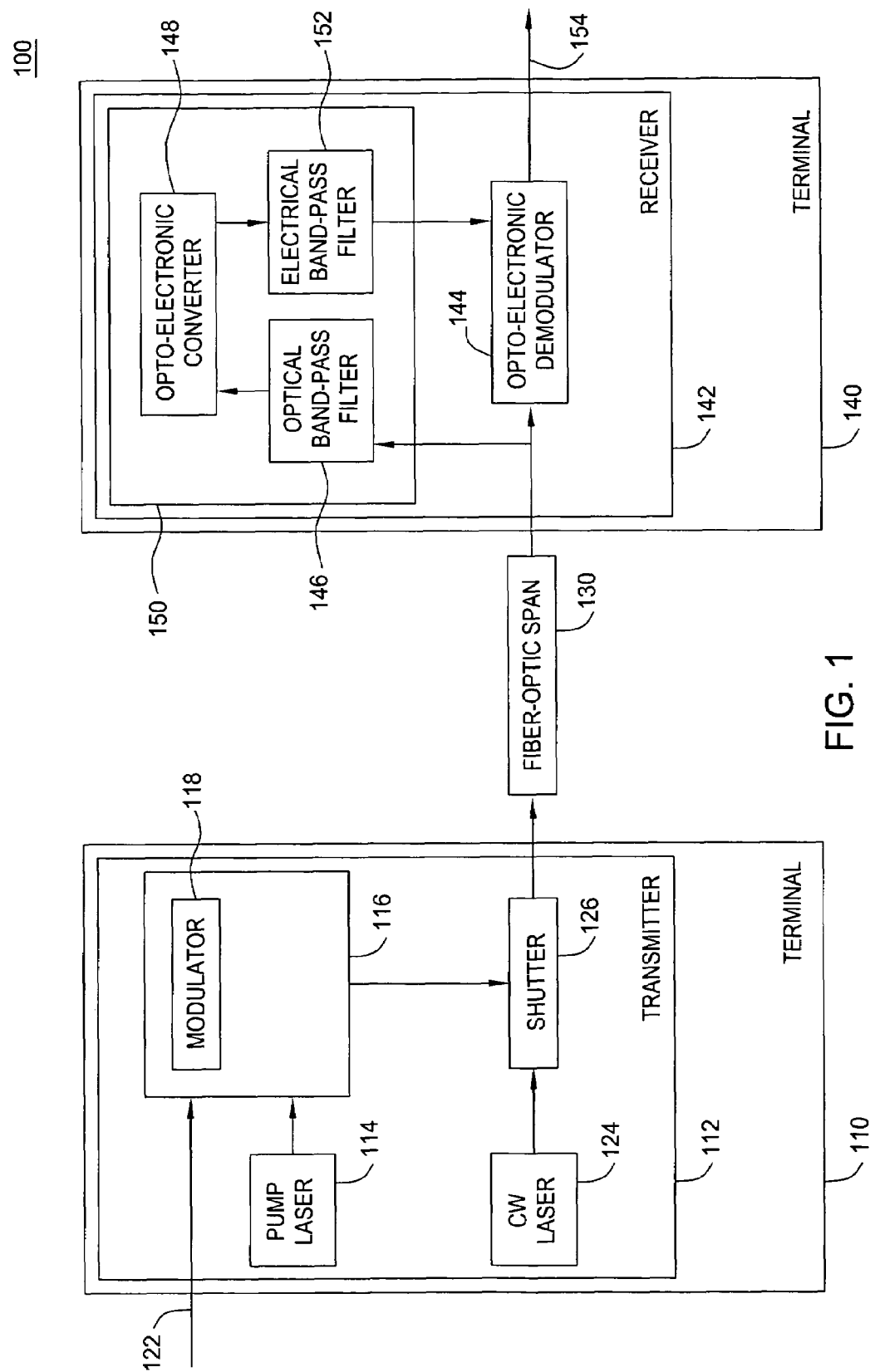
FIG. 1 depicts a high-level schematic diagram of a fiber-optic communication system suitable for use with the present invention.

FIG. 1 depicts a high-level schematic diagram of a fiber-optic communication system suitable for use with the present invention. Specifically, the system 100 of FIG. 1 comprises transmitting/receiving terminals 110 and 140 coupled by a fiber-optic span 130.

The embodiment shown depicts a portion relating to an exemplary optical communication channel of the system 100. For a purpose of brevity, devices conventionally associated with fiber-optic communication channels, such as dispersion compensation units, fiber-optic amplifiers, interleavers, multiplexers, couplers, control modules, and the like, are not shown in FIG. 1.

The span 130 comprises a plurality of single-mode transmission fibers (e.g., from 2 to 16 or more fibers), each fiber facilitating a plurality of fiber-optic communication channels (e.g., up to 128 or more channels). In a further embodiment, the span 130 may comprise fiber-optic amplifiers (e.g., erbium-doped amplifiers) of the transmitted signals.

Each of the terminals 110 and 140 comprises a plurality of wavelength-matched transmitters 112 and receivers 142 (one transmitter 112 and one receiver 142 is shown in the terminal 110 and terminal 140, respectively) associated with individual optical communication channels propagating along transmission fibers of the span 130. In another embodiment (not shown), in the system 100, each of the terminals 110 and 140 may be similarly coupled to more than one such terminal.

In one embodiment, the transmitter 112 generally comprises a pump laser 114, an electro-optical converter 116 including a modulator 118, a coherent continuous-wave (CW) laser 124 (e.g., distributed feedback (DFB) laser), and a Kerr-effect shutter 126. In operation, the electro-optical converter 116 transforms data to be transmitted between the terminals (e.g., from the terminal 110 to the terminal 140), from an electrical domain to the optical domain.

The output beam of the pump laser 114 is modulated, using the modulator 118, at an ultra-high bit rate, such as 160 Gb/s. The pump laser 114 can be either a non-coherent laser or a coherent laser. The modulator 118 is controlled by a data stream communicated, via a wired interface 122, from a source (not shown) of the data to be transmitted from the terminal 110 to the terminal 140.

The modulator 118 (e.g., Mach-Zehnder modulator) uses on/off keying method. The modulator 118 imprints the data information from interface 122 onto the optical signal from the pump laser 114.

In one embodiment, an output signal of the pump laser 114 is selectively group-polarized to form a period pulse train where a state of polarization of bits (i.e., pulses) in adjacent four-bit groups are altered by π/2 (or 90°). Such manipulation of the state of polarization of an output signal of a pump laser is known in the art and may accomplished using, e.g., a Kerr-effect fiber-optic polarizer. In an alternate embodiment, the period pulse train is generated by a picosecond pulse source such as a mode locked laser.

In the transmitter 112, a modulated output signal of the pump laser 114 transfers its data pattern to the coherent output signal of the CW laser 124 to form a phase-correlated optical data stream where phases of bits in adjacent four-bit groups is altered by π (or 180°). Herein, such a modulation scheme is referred to as a group alternating phase (GAP) modulation (discussed in detail in reference to FIG. 2 below).

In one embodiment, the CW laser 124 is modulated using the GAP-CSRZ modulating format using one modulating device. Specifically, the data pattern (e.g., carrier-suppressed return-to-zero (CSRZ) pattern) is transferred to the coherent output signal of the CW laser 124 and supplemented with the GAP modulation of the signal using the Kerr-effect shutter 126 controlled by an output signal of the modulated pump laser 114.

The shutter 126 controls propagation of the coherent beam of CW laser 124, as well as performs a polarization-dependent cross-phase modulation process resulting in the GAP-CSRZ modulation of the coherent beam. An output signal of the Kerr-effect shutter 126 is a phase-correlated data stream where phases of adjacent four-bit groups are altered by π (180°). The output signals may be generated with other formats as described presented in IEEE paper entitled "A 160-Gb/s Group-Alternating-Phase CSRZ Format," published in IEEE Photonic Technology Letters, Volume 17, No. 10, October 2005, which is incorporated herein by reference in its entirety.

A critical impairing factor of a WDM system is an intra-channel four-wave mixing (IFWM) phenomenon associated with non-linearity of transmission fibers of the span 130. The IFWM phenomenon results in transmission errors in a form of ghost pulses (i.e., data bits) in received data streams and imposes limitations on a length of the span 130, and, specifically, a bit rate of a channel. The phase-correlated data steam formed by the transmitter 112 using the GAP-CSRZ modulation format reduces the IFWM phenomenon and, as such, facilitates implementation of high performance ultra-high bit rate fiber-optic communication links in the system 100.

Figure 2:
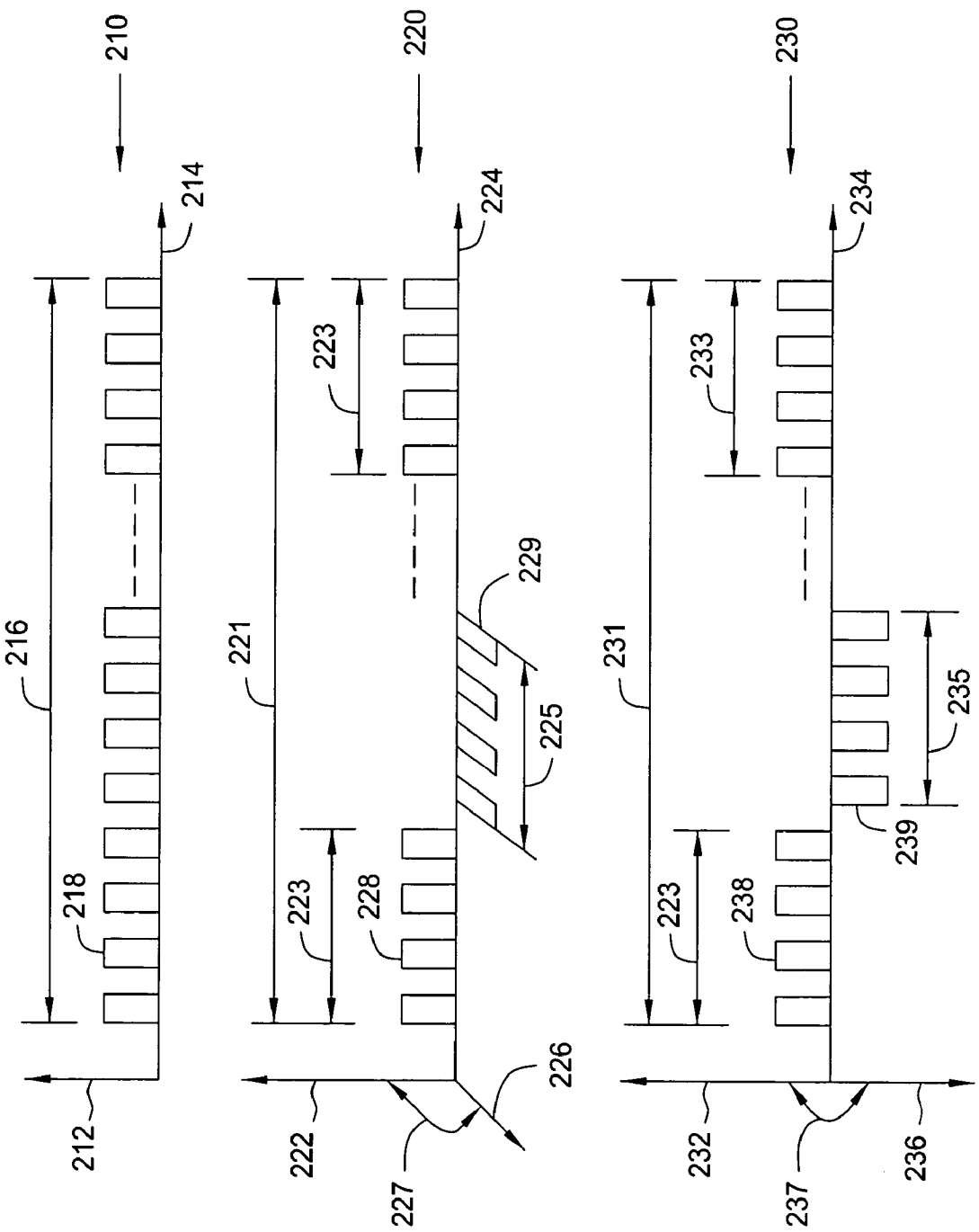
FIG. 2 depicts a series of exemplary timing diagram illustrating modulation formats used in the system of FIG. 1.

FIG. 2 depicts a series 200 of exemplary timing diagram illustrating modulation formats used in the system of FIG. 1. More specifically, the series 200 comprises graphs 210, 220, and 230 where, arbitrarily, electrical and optical pulses are shown as corresponding to logic "1".

A graph 210 depicts amplitudes (y-axis 212) of electrical pulses 218 of an electrical data stream 216 communicated via the wired interface 122 to the electro-optical converter 116 versus time (x-axis 214). In an electrical domain, the data stream 216 represents information to be transmitted, via the fiber-optic span 130, from the terminal 110 to the terminal 140.

A graph 220 depicts amplitudes (y-axis 222 and z-axis 226) of optical pulses 228 (groups 223) and 229 (groups 225) of an optical data stream 221 at an output of the electro-optical converter 116 versus time (x-axis 224). The optical data stream 221 is an amplitude/polarization modulated output signal of the pump laser 114. In an optical domain, the data stream 221 corresponds to the electrical data stream 216 depicted in graph 210. In the data stream 221, a state of polarization (graphically shown as an angle 227 between the axes 222 and 226) of bits in adjacent four-bit groups 223 and 225 is altered by π/2 (or 90°), as discussed above in reference to FIG. 1.

A graph 230 depicts amplitudes (y-axis 232 and z-axis 236) of respective optical pulses 238 (groups 233) and 239 (groups 235) of a phase-correlated optical data stream 211 at an output of the Kerr-effect shutter 126 versus time (x-axis 234). The optical data stream 231 is a coherent output signal of the laser 124 modulated using the GAP-CSRZ modulation format discussed above in reference to FIG. 1. In the data stream 231, phases (graphically shown as an angle 237 between the axes 232 and 236) of bits in adjacent four-bit groups 233 and 235 are altered by π (or 180°).

Referring to FIG. 1, the receiver 140 illustratively comprises an opto-electronic demodulator 142 of optical data streams received, via the fiber-optic span 130, from the transmitter 112, and a synchronization circuit 150. The opto-electronic demodulator 142 converts a received optical data stream (e.g., GAP-CSRZ data stream 231 depicted in FIG. 2) from an optical domain to the electrical domain compatible with a wired interface 154 to an addressee (not shown) of transmitted information. A process of decoding the information contained in a received data stream involves recovering from the data stream a clock signal used, in operation, to synchronize the demodulator 142.

Presently, electronic components (e.g., phase lock loop (PLL), and the like) used in devices recovering the clock signals, such as, for example, opto-electronic oscillation loop devices, are not readily available for data streams having a 160 Gb/s bit rate. In the receiver 140, the clock signal is recovered from the received 160 Gb/s GAP-CSRZ data stream by the synchronization circuit 150 using electronic components that are rated for communication channels having bit rates of about 40 Gb/s.

The synchronization circuit 150 generally includes an optical band-pass filter 146, an opto-electronic converter 148, and an electrical band-pass filter 152. The optical band-pass filter 146 has a bandwidth equal to about ½ of a bandwidth of the received optical signal. For example, when the optical signal is modulated at a bit rate of 160 Gb/s, a bandwidth of the optical band-pass filter 146 may be about 50 GHz. The opto-electronic converter 148 converts an optical pulse train of the received GAP-CSRZ data stream 231 in an electrical signal that is then filtered using a high-Q (e.g., Q=1000, or higher) electrical filter 152 to recover a 40 GHz clock signal suitable for synchronizing the data stream in the electronic demodulator 142.

FIG. 3 depicts a flow diagram of a method for providing ultra-high bit rate fiber-optic communications using the system of FIG. 1. Specifically, the method of FIG. 3 contemplates several system functions suitable for use in accordance with the present invention.

The method of FIG. 3 starts at step 310 where the WDM system, such as the system 100 (discussed in reference to FIG. 1) is provided. The system 100 is adapted for ultra-high bit rate fiber-optic communications and comprises transmitting/receiving terminals 110 and 140 and a fiber-optic span 130.

At step 330, a coherent CW laser (e.g., laser 124) is modulated with a data pattern of the pump laser using, e.g., the GAP-CSRZ modulation format where a difference between phases of pulses in adjacent four-bit groups is set to π (or 180°). Such a method of modulating the coherent CW laser mitigates transmission errors caused by non-linearity of transmission fibers of the fiber-optic span (e.g., span 130) and, specifically, by the IFWM phenomenon in the transmission fibers.

At step 340, a modulated output signal of the CW laser is transmitted by the fiber-optic span (e.g., span 130) coupling terminals of the WDM system.

Referring to box 345, the fiber-optic span comprises single-mode transmission fibers.

At step 350, a received modulated output signal of the CW laser (i.e., coherent data stream formed using the GAP-CSRZ modulating format) is synchronized using a clock signal recovered from the received optical pulse train and then demodulated (i.e., converted in an electrical format). In one embodiment, the clock signal is recovered using a synchronization circuit including an optical band-pass filter having a bandwidth equal to about ½ of a bandwidth of the output signal of the CW laser, an opto-electronic converter, and a high-Q band-pass electrical filter.

Referring to box 355, in one exemplary embodiment when the CW laser is modulated at 160 Gb/s, the optical band-pass filter has a bandwidth of about 48 GHz, the electrical filter has a Q-factor of about greater than or equal to 1000 and a central frequency of about ¼ of a data bit rate, and the synchronization circuit utilized 40 GHz electronic components.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method of synchronizing a receiver in an ultra-high bit rate fiber-optic communications network, comprising:
    modulating a coherent continuous-wave (CW) laser to form a phase-correlated optical data stream comprising a sequence of four-bit groups, wherein adjacent four-bit groups have respective phase relationships offset by $\pi$; and
    transmitting the phase-correlated optical data stream, wherein the phase-correlated optical data stream is adapted to be filtered at the receiver using an optical band-pass filter to recover thereby a clock signal wherein the optical band-pass filter has a bandwidth of about ¼ of a bandwidth of the modulated optical signal of the CW laser.

2. The method of claim 1, further comprises:
    modulating a pump laser with a data pattern stream where a state of polarization of adjacent four-bit groups is altered.

3. The method of claim 2, further comprises:
    modulating the pump laser at a bit rate of about 160 Gb/s.

4. The method of claim 2, wherein the state of polarization of the adjacent four-bit groups is altered by $\pi/2$.

5. The method of claim 2, wherein the coherent CW laser is modulated using a fiber-based Kerr-effect shutter controlled by a modulated output signal of the pump laser.

6. The method of claim 1, wherein the method further comprises:
    using an electro-optical converter comprising a Mach-Zehnder modulator and a controlled polarizer for converting data to be transmitted.

7. An apparatus for synchronizing a receiver in an ultra-high bit rate fiber-optic communications network, comprising:
    means for modulating a coherent continuous-wave (CW) laser to form a phase-correlated optical data stream comprising a sequence of four-bit groups, wherein adjacent four-bit groups have respective phase relationships offset by $\pi$; and
    means for transmitting the phase-correlated optical data stream, wherein the phase-correlated optical data stream is adapted to be filtered at the receiver using an optical band-pass filter to recover thereby a clock signal wherein the coherent CW laser is modulated using a fiber-based Kerr-effect shutter controlled by a modulated output signal of the pump laser.

8. The apparatus of claim 7, further comprises:
    means for modulating a pump laser with a data pattern stream where a state of polarization of adjacent four-bit groups is altered.

9. The apparatus of claim 8, wherein the pump laser is modulated at a bit rate of about 160 Gb/s.

10. The method of claim 8, wherein the state of polarization of the adjacent four-bit groups is altered by $\pi/2$.

11. The method of claim 9, wherein the transmitting means comprises:
    a Mach-Zehnder modulator and a controlled polarizer for converting data to be transmitted.

12. A wavelength division multiplexing (WDM) system for ultra-high bit rate fiber-optic communications, comprising:
    a wavelength-matched transmitter at a first terminal comprises:
    a pump laser;
    an electro-optical converter for converting of data to be transmitted from the first terminal to a second terminal, the electro-optical converter including a modulator of a pump laser beam;
    a coherent continuous-wave (CW) laser; and
    a Kerr-effect shutter for producing, from the coherent beam of the CW laser, a phase-correlated optical data stream comprising a sequence of four-bit groups, whereby adjacent four-bit groups have respective phase relationships offset by $\pi$, wherein the shutter is controlled by a modulated signal of the pump laser;
    a fiber-optic span propagating the phase-correlated data stream between the wavelength-matched transmitter of the first terminal with a wavelength-matched receiver of a second terminal; and
    the wavelength-matched receiver for receiving the phase-correlated data stream comprises:
    an opto-electronic demodulator for demodulating the phase correlated data stream; and
    a synchronization circuit for recovering a clock signal.

13. The system of claim 12 wherein the modulator modulates the pump laser at an ultra-high bit rate.

14. The system of claim 12 wherein the CW laser is modulated to form a phase-correlated optical pulse train where phases of bits in adjacent four-bit groups are altered by $\pi$.

15. The system of claim 12 wherein the modulator uses on/off keying modulation scheme.

16. The system of claim 12 wherein the synchronization circuit further comprises an optical band-pass filter and an electrical band-pass filter, wherein a bandwidth of the optical band-pass filter is about ¼ of a bandwidth of the modulated optical signal of the CW laser.

17. The system of claim 16 wherein a Q-factor of the electrical band-pass filter is greater than or equal to 1000.

18. The system of claim 16 wherein a central frequency of the electrical band-pass filter is about ¼ of the ultra-high bit rate.

* * * * *

UNITED STATES PATENT AND TRADEMARK OFFICE
CERTIFICATE OF CORRECTION

PATENT NO.      : 7,609,976 B2
APPLICATION NO. : 11/239656
DATED           : October 27, 2009
INVENTOR(S)     : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1063 days.

Signed and Sealed this

Twelfth Day of October, 2010

David J. Kappos
*Director of the United States Patent and Trademark Office*